United States Patent [19]
Massei

[11] 3,915,864
[45] Oct. 28, 1975

[54] VESSEL FOR REMOVING LIQUID CONTAMINANTS FROM THE SURFACE OF A WATER BODY

[75] Inventor: Ornella Massei, Leghorn, Italy

[73] Assignee: Co. Ba. Di. Costruzioni Battelli Disinquinanti S.p.A., Rome, Italy

[22] Filed: Mar. 25, 1974

[21] Appl. No.: 454,641

[30] Foreign Application Priority Data
Mar. 27, 1973 Italy .................................. 67871/73

[52] U.S. Cl. ................................ 210/242; 210/242
[51] Int. Cl.² ........................................ E02B 15/04
[58] Field of Search ......... 210/73, 83, 242, DIG. 21

[56] References Cited
UNITED STATES PATENTS

| | | | |
|---|---|---|---|
| 3,615,017 | 10/1971 | Valdespino | 210/242 |
| 3,656,623 | 4/1972 | Quase | 210/DIG. 21 |
| 3,664,505 | 5/1972 | Brittingham | 210/DIG. 21 |
| 3,666,099 | 5/1972 | Gallcia | 210/242 |
| 3,700,107 | 10/1972 | Flaviani | 210/DIG. 21 |
| 3,715,034 | 2/1973 | Ivanoff | 210/242 |
| 3,752,317 | 8/1973 | Lithen | 210/242 |

*Primary Examiner*—Theodore A. Granger
*Attorney, Agent, or Firm*—Sughrue, Rothwell, Mion, Zinn & Macpeak

[57] ABSTRACT

A vessel for use in removing a floating contaminant liquid such as oil from the surface of water has a hull forming an immersed inverted channel into which surface layers flow as the vessel advances, the hull being shaped so as to guide the liquid into accumulation zones from which the liquid is drawn by a pump into settling tanks disposed in pontoons on each side of the hull, the water being discharged from the tanks and the contaminant liquid being collected in the tanks. and react

11 Claims, 8 Drawing Figures

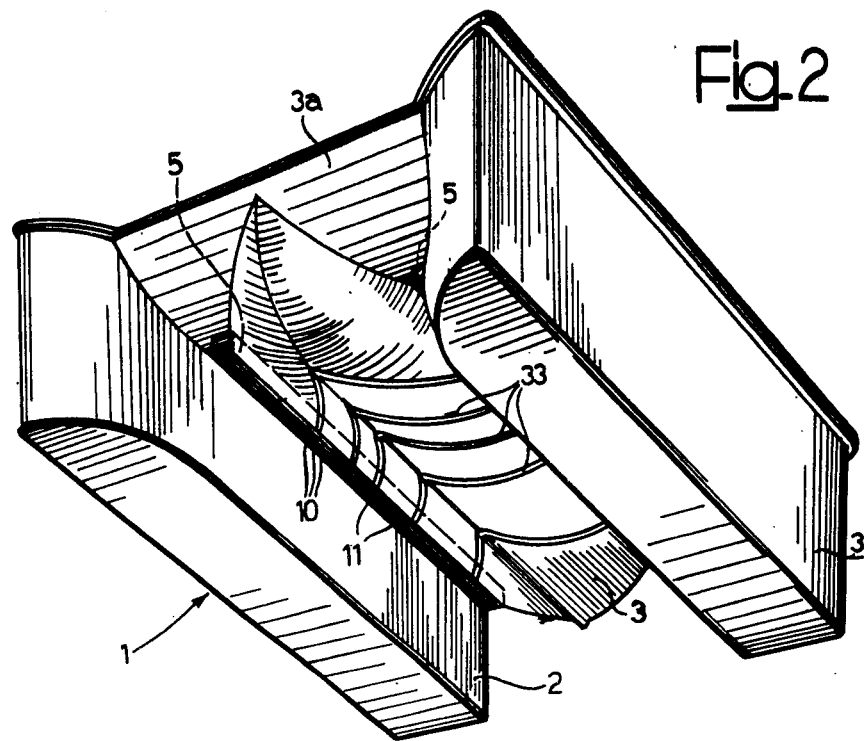
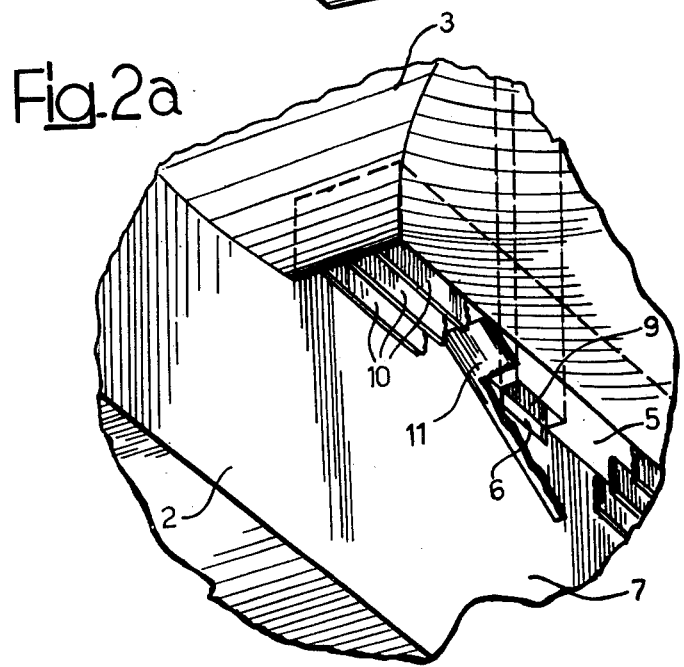

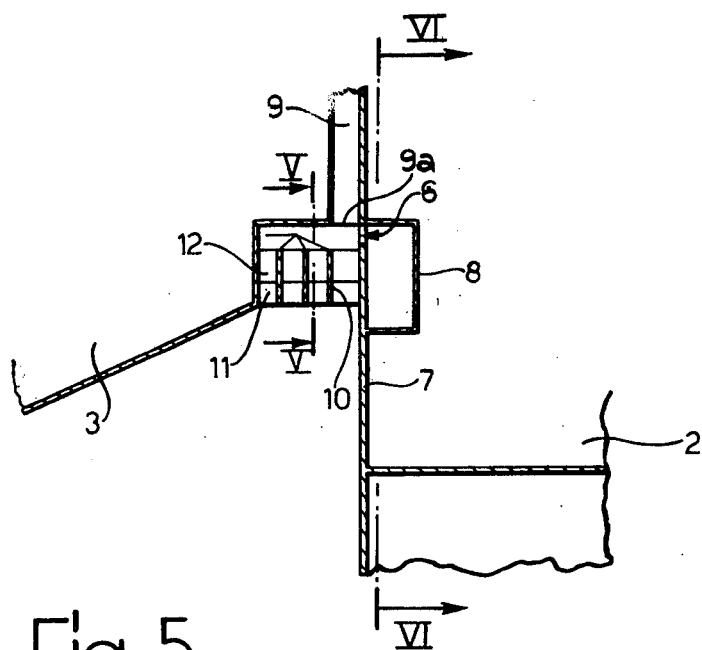
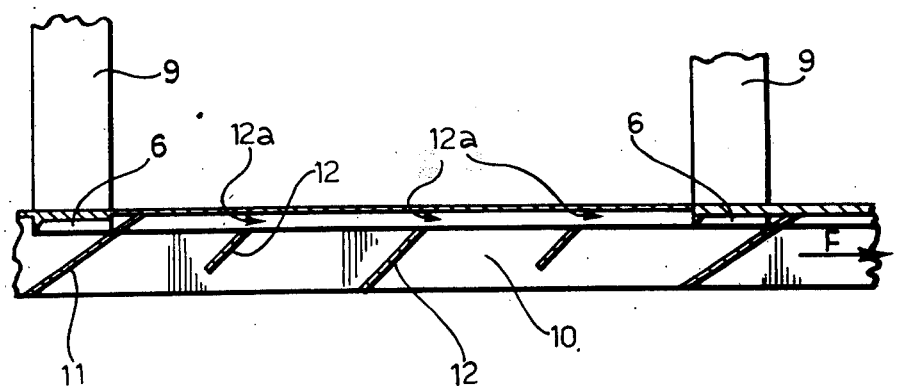

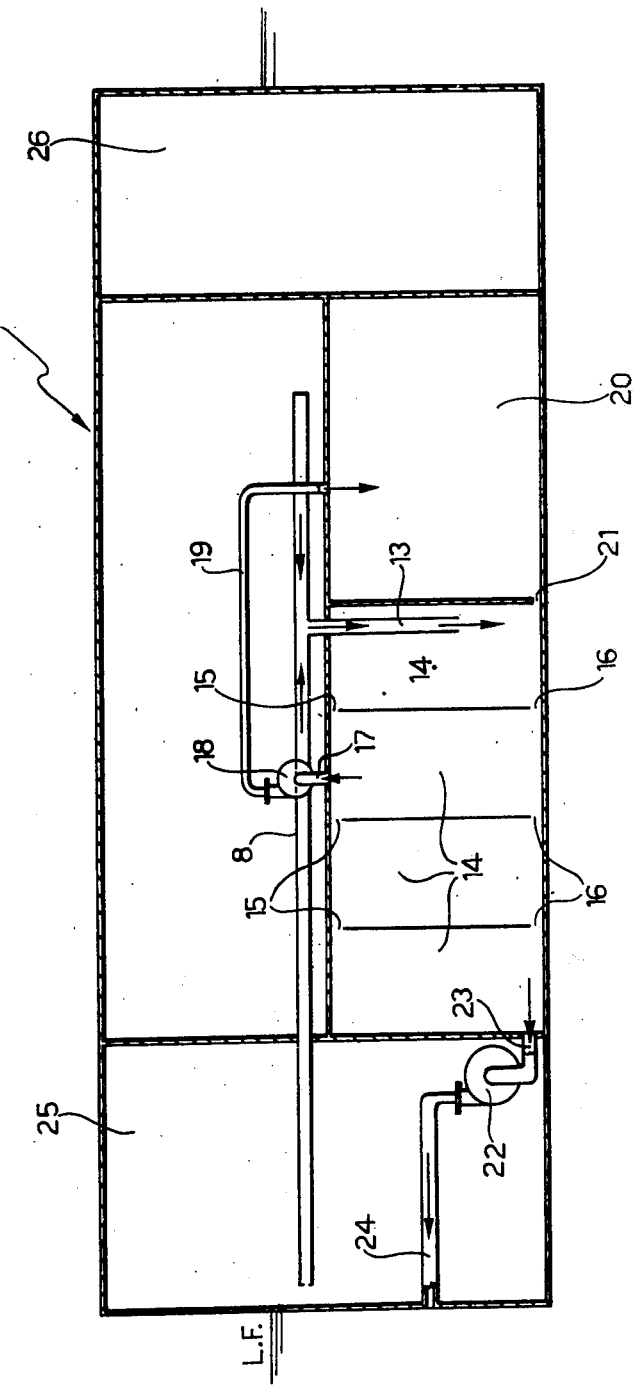

3,915,864

VESSEL FOR REMOVING LIQUID CONTAMINANTS FROM THE SURFACE OF A WATER BODY

BACKGROUND OF THE INVENTION

The present invention relates to systems for removing from the surface of a body of water a lighter contaminant liquid.

In practice it is often necessary to remove from the surface of the sea, contaminating liquids of different nature which, having less density than the water, become concentrated upon the upper surface thereof. This problem is especially acute in eliminating from the surface of the sea contaminant liquids of an oily nature, where the problem arises particularly in proximity to ports and may be caused by oil discharge from ships and by the washing-out operations of the holds of tankers. It is also necessary with everincreasing frequency to work on the open sea due to oil spillage accidents or wrecks involving tankers. In such situations it is desirable to use a vessel for removing the contaminant liquid which is both seaworthy and able to reach the contaminated area with sufficient speed.

Many systems have been adopted hitherto in order to attempt to solve the abovementioned problems. One widely known procedure which has been used is based upon the use of chemical solvents capable of dissolving the contaminating liquid. The resulting solution, having a greater density than that of the water, sinks to the bottom of the sea. However, such a procedure has the serious disadvantage of greatly damaging the marine fauna and destroying the flora on the sea bed itself. Other known systems are based upon introduction into the interior of the hull of a floating vessel of the surface layers of the water to be purified and upon successive separation of the contaminant liquid from the water. Such systems have the disadvantage of having to introduce and cause to flow inside the vessel, together with the contaminant liquid, a considerable quantity of water, which inevitably leads to the vessel being unsuitable for use in the open sea, and having very much reduced efficiency if used in rough seas, the vessel also having a slow speed of movement even under nonworking conditions.

An object of the present invention is to obviate the above-cited disadvantages.

SUMMARY OF THE INVENTION

Accordingly the present invention provides a system of removing from the surface of a body of water a contaminant liquid of lower density than the water, the system comprising:

conveying surface layers of the body of water into an inverted channel immersed in the water and having its upper surface at a level lower than the free surface of the body of water;

forming in the upper part of the inverted channel, through the formation of vortices, axially spaced apart zones for the accumulation of the contaminant liquid, applying suction to said accumulation zones for the purpose of withdrawing the contaminant liquid accumulated therein and conveying it into decantation or settling tanks.

The present invention also provides a vessel for use in removing from the surface of a body of water a contaminant liquid of lower density than the water, characterised in that the vessel comprises:

at least two pontoons provided with tanks for the collection and decantation of the contaminant liquid;

a hull extending between each pair of adjacent pontoons and having in transverse cross section a profile different points of which have different distances from the plane tangent to the bottoms of the pontoons;

at least one inverted longitudinal channel formed by the hull in the or each zone of greatest distance from the said tangent plane;

means defining in the upper part of each inverted channel when the latter is completely immersed during forward movement of the vessel through surface-contaminated water, accumulation zones for the contaminant liquid in correspondence with apertures in a wall of the inverted channel, and means for transferring into the collection and decantation tanks by the application of suction the liquid accumulated in the said accumulation zones of the inverted channels.

BRIEF DESCRIPTION OF THE DRAWINGS

The invention will now be more particularly described, by way of non-limiting example, with reference to the accompanying drawings, in which:

FIG. 2 is a perspective view from below of the vessel of FIG. 1;

FIG. 2a is a detail on an enlarged scale of FIG. 2;

FIG. 4 is a detail on an enlarged scale of FIG. 3;

FIG. 5 is a partial cross section of FIG. 4 along the line V—V;

FIG. 6 is a longitudinal section of the vessel, taken along the line VI—VI of FIG. 4.

DETAILED DESCRIPTION OF THE ILLUSTRATED EMBODIMENTS

Figure 1:
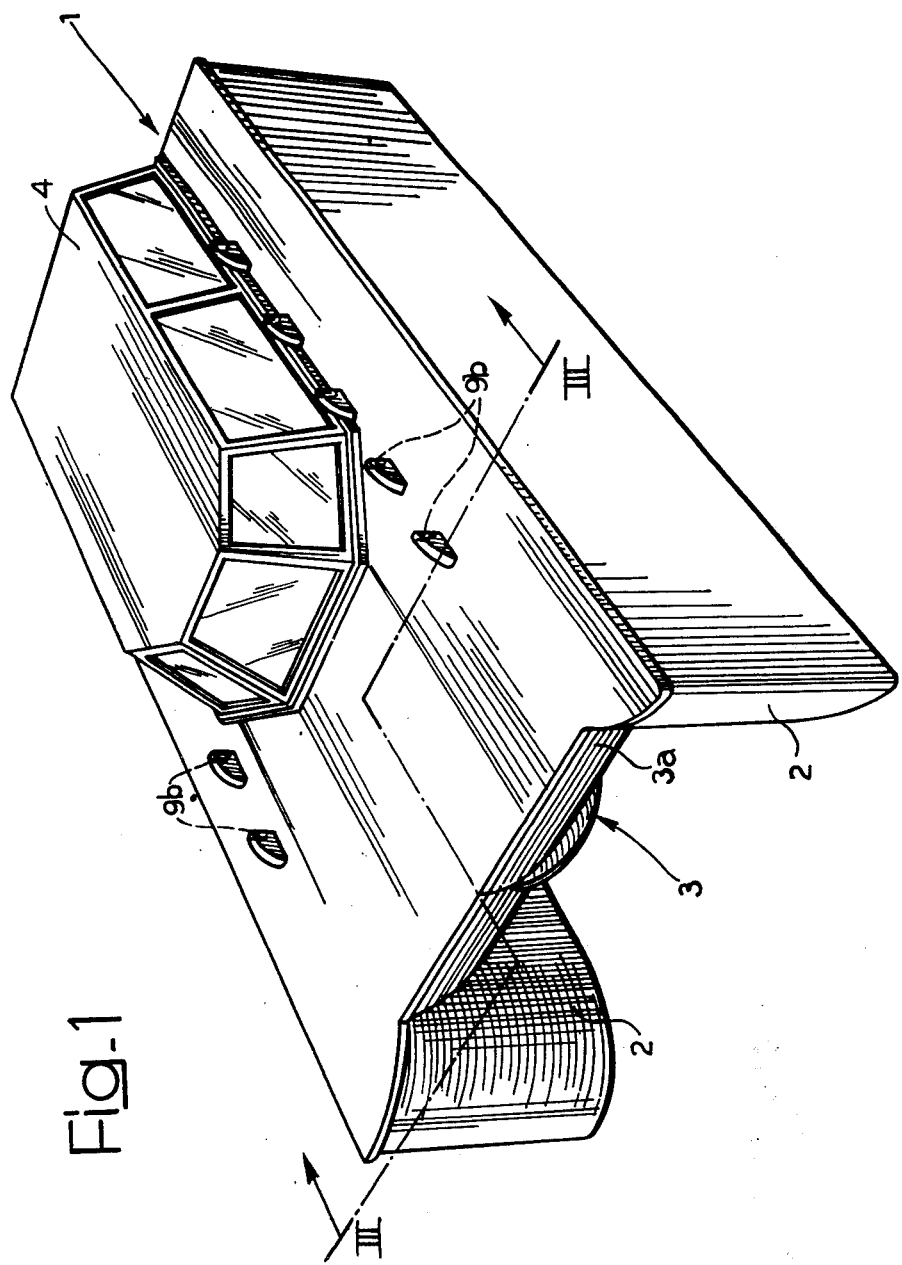
FIG. 1 is a perspective view from above of a vessel according to one embodiment of the invention.

Referring to the drawings, a vessel 1 according to the invention comprises two lateral pontoons 2 joined together by a central hull 3 and surmounted by a cabin 4. The central hull 3 has a cylindrical forepart 3a which meets the upper deck of the vessel: the remaining part of the central hull 3 has a V-profile in transverse section with its vertex facing downwards, so that different points in the cross sectional profile of the bottom of the hull 3 have different distances from the plane HH tangent to the bottoms of the pontoons 2. This profile is symmetrical with respect to the longitudinal plane of symmetry of the vessel and defines, in proximity to the connection of the central hull 3 to each of the lateral pontoons 2, a collection zone which is a greater distance from the said tangent plane H—H than the vertex of the hull 3. In each of the collection zones the central hull 3 forms an inverted channel 5 extending longitudinally over the greater part of the length of the vessel. The hull 3 has a series of fishbone ribs 33 the vertices of which point forwardly. The ribs 33 act as deflectors guiding the liquid which flows over the bottom surface of the central hull 3 towards the two channels 5.

The internal wall 7 of each lateral pontoon 2 which forms the outer boundary of the respective inverted channel 5 is provided with a plurality of rectangular apertures 6 in the upper zone of said inverted channel 5. The apertures 6 open into a manifold 8 disposed inside the adjoining pontoon 2 parallel to the inverted channel 5 and having a length substantially equal to that of the said inverted channel.

The part of the central hull 3 which constitutes the top of each inverted channel 5 is provided with apertures 9a disposed in correspondence with the respective apertures 6. Each aperture 9a communicates with a vertical conduit 9 which opens into the atmosphere through a narrow ventilator opening 9b facing rearwardly, and situated on the upper deck of the vessel 1.

Each inverted channel 5 is furnished with a plurality of longitudinal fins 10 extending throughout the entire length of the channel 5. The fins 10 extend in height from the bottom of the channel 5 as far as the lower edges of the apertures 6. Perpendicularly to the longitudinal fins 10 there are disposed a plurality of main transverse fins 11 extending over the entire width and entire height of each inverted channel 5. Between each pair of successive transverse deflector fins 11 there are provided a plurality of auxiliary transverse deflector fins 12 also extending over the entire width of the inverted channel 5, but not extending over the entire height of the channel: more specifically, between the edges of the auxiliary fins 12 and the top of the said inverted channels there is provided a flow passage 12a. The transverse fins 11 and 12 are upwardly inclined with respect to the direction of advance of the vessel 1 in the water, as indicated in FIG. 5 by the arrow F, and give rise to vortices in the liquid as the vessel advances so as to trap the contaminant liquid in the respective channels 5, as hereinafter described.

The manifold 8 communicates through a conduit 13 with a plurality of decantation tanks 14 communicating with each other through apertures 16 and 15 formed respectively in the lower part and in the upper part of said tanks. A decantation pump 18 draws off, through a conduit 17, the liquid accumulated in the tanks 14 and conveys it through a conduit 19 into a slow settling tank 20 closed at the top and communicating at the bottom with the tanks 14 through an aperture 21. A discharge pump 22 withdraws liquid from the lower zone of the tanks 14 through a conduit 23 and discharges it into the surrounding water through a discharge conduit 24. Each lateral pontoon 2 has an aft buoyancy tank 25 and a forward buoyancy tank 26.

Figure 3:
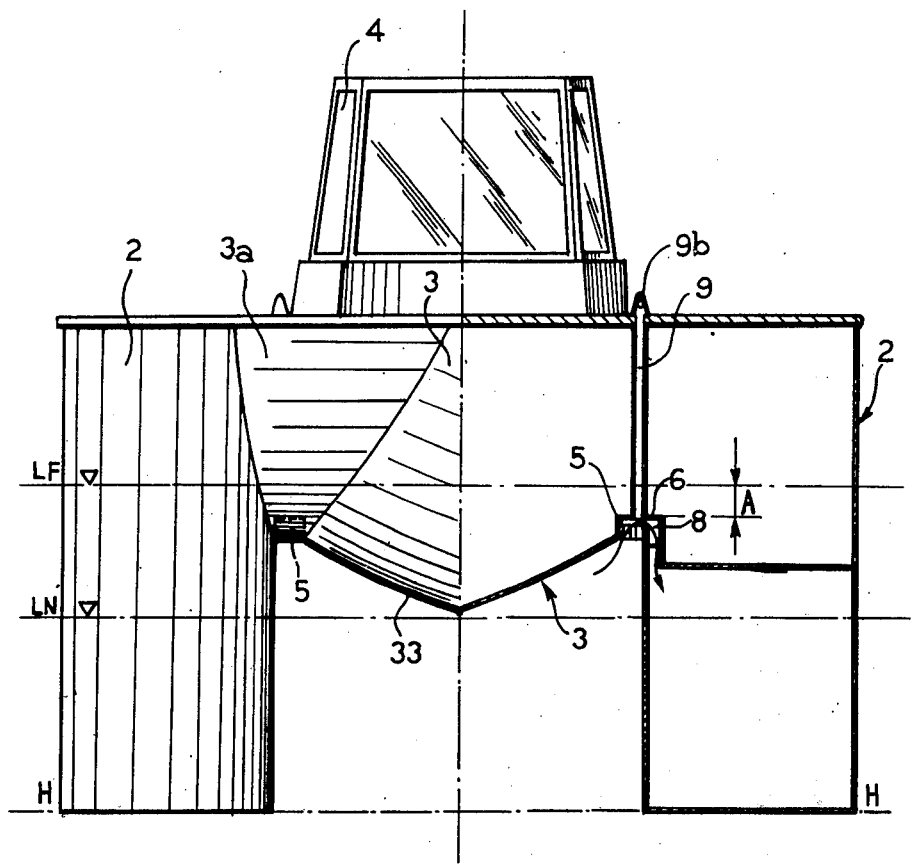
FIG. 3 is a transverse cross section of the vessel along the line III—III of FIG. 1.

FIG. 3 shows at LN the level of the free surface of water under normal navigation conditions of the vessel, and at LF the level of the free surface of the water under conditions of use of the vessel, in which it removes contaminant liquid from the surface of the water.

The manner of operation of the vessel previously described, is as follows. When the vessel is under way the decantation containers 14 are partially empty and consequently the central hull 3 is completely clear of the water. Under such conditions the vessel 1 is able to move quickly and proceed to the operating zone. Once the vessel reaches the operating zone a pump —not shown— fills the decantation tanks 14 so that the vessel sinks up to the operating level LF. In this situation the upper wall of each inverted channel 5 lies at a depth A (FIG. 3) which is dependent on the dimensions of the vessel 1: for example for a vessel 1 having a length between 12 and 15 meters, the depth A varies between 30 and 50 cms, the latter depth being adopted when the vessel 1 is used in rough seas.

The forward motion of the vessel 1 relative to the surrounding water thrusts the surface layers of the water, having regard to the profile of the underside of the central hull 3 and the inclination of the ribs 33, into the two inverted channels 5 disposed at the two sides of the hull 3. In each inverted channel 5 the surface layers are deflected towards the upwardly inclined deflector fins 11 and 12. The contaminant liquid, being lighter, tends to rise and remains trapped in the upper zones of the inverted channels 5 between the successive deflector fins 11. Such upper zones constitute, therefore, accumulation zones for the contaminant liquid. When the pump 22 is put into operation suction is applied to the inside of the tanks 14 and, through the conduit 13, to the manifold 8. The contaminant liquid in the accumulation zones of the inverted channels 5 is drawn through the apertures 6 into the manifolds 8, the apertures 6 being each positioned immediately downstream of upper ends of the deflector fins 11. The contaminant liquid trapped between the fins 11 is thus drawn through the manifolds 8 into the tanks 14. The auxiliary deflector fins 12 facilitate the circulation of the contaminant liquid towards the apertures 6 in the accumulation zones.

The lighter contaminant liquid collects in the upper parts of the tanks 14 whilst the water is collected in the lower parts of the tanks and is discharged into the surrounding water by the pump 22 through the conduit 23 and the discharge conduit 24. The tanks 14 are thus refilled progressively with contaminant liquid.

For the purpose of obtaining more efficient separating or decanting action the decantation pump 18 withdraws liquid from the upper parts of the tanks 14 and decants it to the interior of the slow settling tank 20 which is closed in its upper region whilst its bottom region is connected through the aperture 21 to the tanks 14. The tanks 14 and the slow settling tank 20 are provided with vents (not shown) in their upper walls for the escape of trapped air.

The slow settling tank 20, being watertight, permits the accumulation in its upper part of contaminant liquid, even when the vessel 1 is operating in a rough sea. It will be noted that even under these conditions, the concentration of the contaminant liquid in the accumulation zones is substantial, given the tendency of that liquid, being lighter than the water to rise in the tanks 14. The contaminant liquid therefore becomes trapped in the accumulation zones comprised between the deflector fins 11 from which zones subsequent dislodgement of the said liquid would be difficult, notwithstanding the vortex action in the water underneath these zones. The longitudinal fins 10 also serve to smother such turbulence and vortex action in the accumulation zones.

The use of the vessel 1 is continued until total refilling with the contaminant liquid of the settling tank 20, and almost total refilling of the tanks 14 has occurred. At this point the operation of the vessel 1 is ceased.

Figure 7:
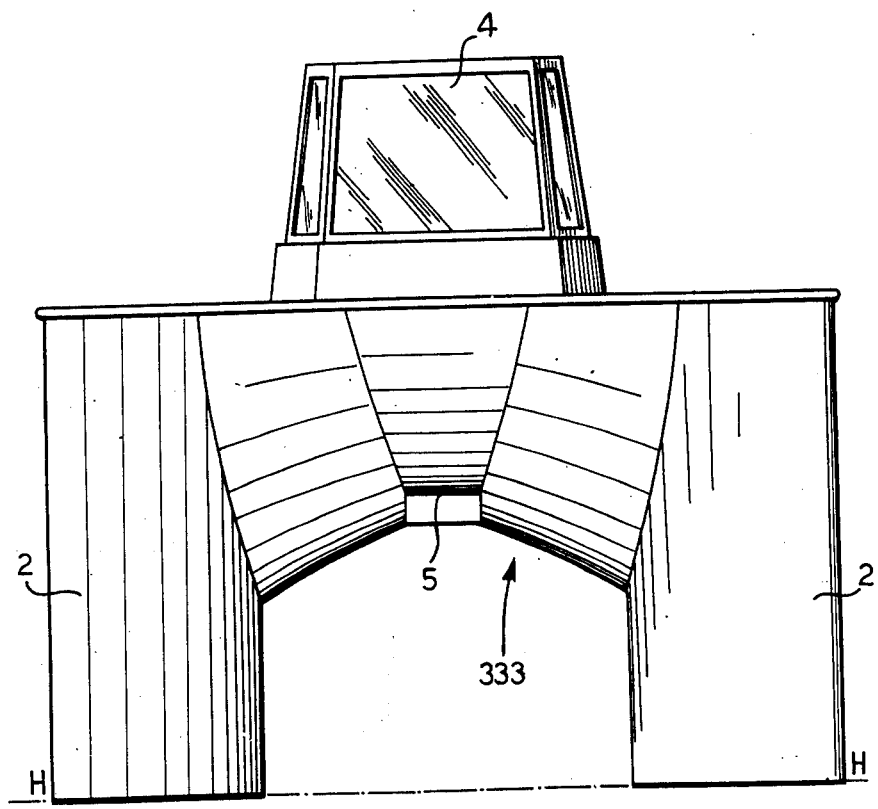
FIG. 7 is a variation of FIG. 3 according to another embodiment of the invention.

In the variant illustrated diagrammatically in transverse cross section in FIG. 7 the central hull of the vessel, shown at 333, has an inverted V-profile with its vertex facing upwards, having therefore a single central zone of maximum distance from the plane H—H tangent to the bottoms of the pontoons 2. A single inverted channel 5 is arranged in this central zone of the hull 333.

It will be appreciated that constructional details of practical embodiments of the vessel according to the invention may be varied widely with respect to what has been described and illustrated by way of example, without thereby departing from the scope of present invention as defined in the claims. Thus for example the vessel may be equipped with three or more pontoons and the profile of the hull between each pair of pontoons could be of different form from the V-shaped profile of the illustrated embodiments.

I claim:

1. A vessel for collecting a liquid floating on the surface of a body of water, said vessel comprising a V-shaped hull portion, a deck thereover, and catamaran hull portions connected to said deck at each side of said hull portion, a downwardly open collecting channel structure located beneath said deck between said hull portion and said catamaran hull portions at each side of said V-shaped hull portion, the surface of each side of said hull, arranged in an upwardly inclined V, joining at its upper edge the downwardly open side of said collecting channels whereby liquid displaced by said V-shaped hull portion is deflected into said downwardly open collecting channels, divider means longitudinally spaced within said collecting channels dividing said channels into a plurality of separated fluid compartments, and means for removing collected fluid from each of said compartments.

2. A vessel as set forth in claim 1 wherein said V-shaped hull portion is provided with a plurality of spaced apart ribs extending angularly and rearwardly toward the stern of the vessel to direct said fluid to be collected toward said downwardly open collecting channels.

3. A vessel as set forth in claim 1 wherein said divider means are comprised of spaced apart transverse fins extending over the entire width and the entire height of said downwarly open collecting channels.

4. A vessel as set forth in claim 3 wherein said transverse fins are upwardly inclined from the bow to the stern of the vessel.

5. A vessel as set forth in claim 3 further comprising a plurality of auxiliary transverse fins in each compartment extending across the width of said downwardly open collecting channels but spaced from the uppermost wall thereof.

6. A vessel as set forth in claim 3 wherein each of said downwardly open collecting channels is provided with longitudinal fins extending throughout the entire length of said channels perpendicular to but spaced from the uppermost wall of said channels.

7. A vessel as set forth in claim 1 including at least one aperture extending through the upper portion of each of said fluid compartments and means for drawing through said apertures the liquid accumulated in each of said fluid compartments.

8. A vessel as set forth in claim 7 including at least one air exhaust conduit communicating with each of said fluid compartments at a location close to said aperture in said compartment.

9. A vessel as set forth in claim 7 further comprising storage tanks located in said catamaran hull portions for the collection and decantation of the collected liquid.

10. A vessel as set forth in claim 9 wherein said means for drawing the collected liquid through the apertures comprises manifold means disposed in communication with the apertures of each compartment, conduit means connecting said manifold means with one of said tanks, passage means interconnecting said tanks and a suction pump arranged to withdraw the lower layers of liquid contained in said tanks and discharging the same into the surrounding water to create a suction in the tanks suitable for the purpose of drawing into the latter the liquid collected in said compartments.

11. A vessel as set forth in claim 10 including auxiliary settling tank means disposed adjacent said decantation tanks, flow passage means connecting said decantation tanks with the lower part of said auxiliary settling tank means and a decantation pump adapted to take off the top layers of liquid contained in said decantation tanks and conveys the same to said auxiliary settling tank means.

* * * * *